Nov. 13, 1962 R. POSPISCHIL ET AL 3,064,209
DUAL PUSH-PULL MODULATOR
Filed Dec. 15, 1959
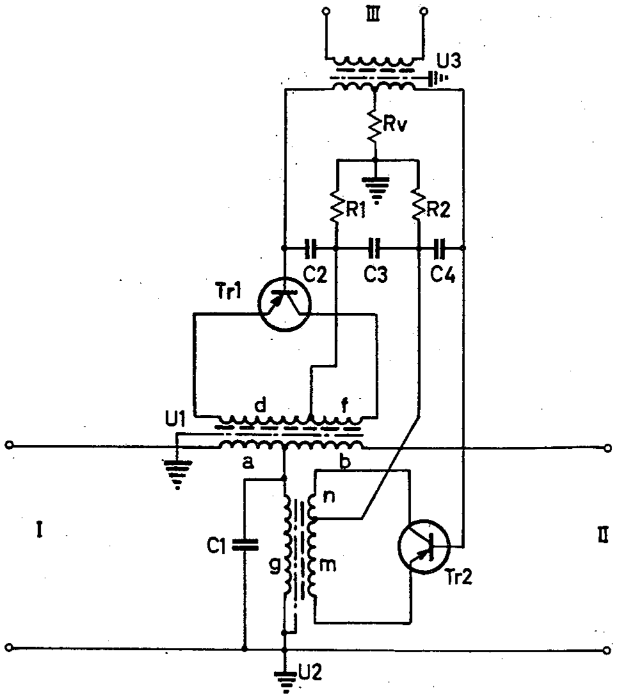

United States Patent Office 3,064,209

Patented Nov. 13, 1962

3,064,209

DUAL PUSH-PULL MODULATOR

Reginhard Pospischil and Wilhelm Hulsebus, Munich, Germany, assignors to Siemens & Halske Aktiengesellschaft Berlin and Munich, a corporation of Germany Filed Dec. 15, 1959, Ser. No. 859,806
Claims priority, application Germany Dec. 17, 1958
1 Claim. (Cl. 332—43)

This invention is concerned with a dual push-pull modulator of non-symmetric structure for use in the conversion of broad frequency bands.

The object of the invention is to provide a transistor modulator operating as a dual push-pull modulator and requiring, as compared with previously known dual push-pull modulators, lower carrier capacity.

In order to realize this object, the dual push-pull modulator according to the invention comprises a T-member formed of two transformers, means for conducting the signal frequency to the input of the T-member and means for obtaining the modulation products at the output thereof, the primary winding of one transformer being disposed in the longitudinal branch and having a tap connnected with the primary winding of the other transformer which is bridged by a capacitor and disposed in the transverse branch, means for connecting the secondary windings of the respective transformers each with the collector-emitter electrodes of a transistor, a symmetrizing transformer having a primary winding to which is conducted the carrier frequency, means for connecting a center top of the secondary winding of the symmetrizing transformer with ground by way of a first resistor while connecting the respective ends thereof each with the base of one of the transistors, means for providing the secondary winding of each transformer of the T-member with a tap which is respectively connected to ground by way of a second and third resistor, means for connecting a capacitor respectively between the base of one transistor and said second resistor and between the base of the other transistor and the third resistor, and means for connecting a further capacitor across the leads extending from the taps of the respective secondary windings of the transformers of the T-member to said second and third resistors. The dual push-pull modulator constructed in this manner requires as compared with previously known dual push-pull modulators a considerably lower carrier capacity. For example, to obtain similarly spaced modulation noise products, the dual push-pull modulator according to the invention requires less than one-fifth of the carrier capacity required in a ring modulator of previously known construction and containing germanium diodes.

An embodiment of the invention will now be explained with reference to the accompanying drawing.

The circuit of a dual push-pull modulator shown in the drawing represents in non-triggered condition a fork circuit wherein the transistor *Tr*1 is disposed in the origin of the coordinates while the other transistor *Tr*2 is disposed in the line branch. The transformers U1 and U2 are dimensioned in accordance with known fork circuits, that is, for an impedance $Z_I$ at the side I and an impedance $Z_{II}$ at the side II, whereby $$Z_I = u \cdot Z_{II}$$

the number of turns of the primary winding of the transformer U1 will act in accordance with $$a:b = u:1$$

If L1 is the inductivity of the entire primary winding $(a+b)$ of U1 and L2 the inductivity of the primary side $(g)$ of U2, there will obtain $$\frac{L1}{L2} = \frac{(a+b)^2}{a \cdot b}$$

If the emitter-collector impedance of both transistors is identical, we obtain for the secondary sides $$(d+f):(a+b) = s$$

$$(m+n):g = t$$

and $$\frac{s}{t} = \frac{\sqrt{a \cdot b}}{a+b}$$

therefore $$(d+f) = t \cdot \sqrt{ab}$$

$$(m+n) = t \cdot g$$

For the selection of $t$, the imaginary impedance of the transistor $$Z_T = \sqrt{R_d} \cdot R_s$$

will become decisive, with $R_d$ as emitter-collector impedance in conductive condition and $R_s$ in blocked condition.

The relation $$\frac{d}{f} = \frac{m}{n}$$

depends upon the non-symmetry of the transistor employed. The capacity of the transformer U1 is reproduced by the capacitor C1 together with the capacity of the transformer U2.

Half of the voltage appearing on the secondary side of the transformer U3 is respectively conducted to each transistor *Tr*1, *Tr*2 by way of resistors $R_v$ and respectively R1 and R2. The resistors R1 and R2 limit the passage of carrier current and permit the full blocking voltage to become effective at the transistors *Tr*1 and *Tr*2. The resistor $R_v$ moreover increases the blocking voltage of the respective transistors. The charge of the capacitor C3 is reversed by the transistor which happens to become conductive. It distorts the carrier current in a manner known from the ring modulator, shortens the switching times of the transistors *Tr*1, *Tr*2, thereby increasing the spacing of modulation noise products. The carrier frequency transformer U3 is at the same time tuned to resonance by the capacitor C3 jointly with the two capacitors C2 and C4.

The illustrated transistor modulator according to the invention is as the ring modulator a dual push-pull modulator. However, as compared with the ring modulator which employs a symmetrical chain matrix, it has an unsymmetrical chain matrix. The consequence is that it is directionally independent only for modulation products with odd multiples of the signal frequency, while being directionally dependent for modulation products with even multiplies of the signal frequency (for example, carrier residues, $a_{k2}$, $a_{k4}$, etc.). The modulation products appear at the side II responsive to conducting the signal frequency to the side I.

The transistor modulator according to the invention is at a given carrier capacity superior to the ring modulator employing diode rectifiers owing to the greater spacing of noise products than can be achieved. Further advantages reside in the unsymmetrical construction and in the possibility of realizing modulator repeaters in simpler manner.

Changes may be made within the scope and spirit of the appended claim which defines what is believed to be new and desired to have protected by Letters Patent.

We claim:

A dual push-pull modulator of unsymmetrical structure, especially for the conversion of broad frequency bands, comprising a T-member formed of two transformers, means for conducting the signal frequency to the input of said T-member and means for obtaining the modulation products at the output thereof, the primary winding of one of said transformers being disposed in the longitudinal branch and having a cap connecting with one terminal of the primary winding of the other transformer which is disposed in the transverse branch, means for connecting a capacitor in parallel with the primary winding of the transformer disposed in the transverse branch, one side of said capacitor and the other terminal of said last named primary winding connected to ground, a pair of transistors, means for connecting the secondary winding of each of said transformers with the collector-emitter electrodes of the respective transistors, a symmetry transformer, means for conducting the carrier frequency to the primary winding of said symmetry transformer, means for connecting the respective ends of the secondary winding of said symmetry transformer each with the base of one of said transistors, means for connecting taps of the secondary windings of the respective transformers each by way of a resistor to ground, means for connecting the base of each transistor with the tap of the respectively associated transformer, and means for bridging a capacitor respectively across the leads extending from the respective base electrodes and said taps.

References Cited in the file of this patent

UNITED STATES PATENTS 2,943,271 Willis ------------------ June 28, 1960